(12) United States Patent
Shim et al.

(10) Patent No.: US 12,381,972 B2
(45) Date of Patent: Aug. 5, 2025

(54) ANTENNA FOR A MOBILE TERMINAL THAT OVERLAPS A SIDE BUTTON

(71) Applicant: LG ELECTRONICS INC., Seoul (KR)

(72) Inventors: Hongjo Shim, Seoul (KR); Hyunwoo Kim, Seoul (KR); Sungwook Chang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 6 days.

(21) Appl. No.: 17/766,692

(22) PCT Filed: Oct. 18, 2019

(86) PCT No.: PCT/KR2019/013708
§ 371 (c)(1),
(2) Date: Apr. 5, 2022

(87) PCT Pub. No.: WO2021/075605
PCT Pub. Date: Apr. 22, 2021

(65) Prior Publication Data
US 2024/0089367 A1    Mar. 14, 2024

(51) Int. Cl.
*H01Q 1/24* (2006.01)
*H04M 1/724* (2021.01)
*H04M 1/725* (2021.01)

(52) U.S. Cl.
CPC ........... *H04M 1/725* (2013.01); *H04M 1/724* (2021.01); *H04M 2250/12* (2013.01)

(58) Field of Classification Search
CPC .. H04M 1/725; H04M 1/724; H04M 2250/12; H04M 1/02; H01Q 1/24; H01Q 1/243; H01Q 1/38
See application file for complete search history.

(56) References Cited

U.S. PATENT DOCUMENTS

| | | | |
|---|---|---|---|
| 2012/0154248 A1* | 6/2012 | Haque | H01Q 21/065 343/880 |
| 2012/0249383 A1 | 10/2012 | Hsu et al. | |
| 2014/0302705 A1* | 10/2014 | Park | H04M 1/236 439/660 |
| 2016/0328024 A1* | 11/2016 | Downey | G06F 1/1694 |
| 2018/0167120 A1* | 6/2018 | Zhang | H04B 7/0871 |
| 2018/0328799 A1* | 11/2018 | Park | G01L 1/144 |
| 2019/0265832 A1* | 8/2019 | Chan | G06F 3/0412 |

FOREIGN PATENT DOCUMENTS

| | | |
|---|---|---|
| KR | 10-2007-0074714 A | 7/2007 |
| KR | 2007074714 * | 7/2007 |
| KR | 10-2007-0082308 A | 8/2007 |
| KR | 10-2015-0031968 A | 3/2015 |

(Continued)

*Primary Examiner* — Angelica Perez
(74) *Attorney, Agent, or Firm* — Birch, Stewart, Kolasch & Birch, LLP

(57) ABSTRACT

Provided is a mobile terminal which can additionally mount antennas without needing to change the positions of buttons and thus without reducing the usability thereof, the mobile terminal comprising: an antenna module disposed inside the side surface of a case; and a user input module overlappingly disposed inside the antenna module and including a force sensor for pressure sensing.

13 Claims, 14 Drawing Sheets

(56) References Cited

FOREIGN PATENT DOCUMENTS

| KR | 2015031968 | * | 3/2015 |
|----|------------|---|--------|
| KR | 10-1675274 | * | 11/2016 |
| KR | 10-1675274 B1 | | 11/2016 |
| KR | 10-1714624 | * | 3/2017 |
| KR | 10-1714624 B1 | | 3/2017 |

\* cited by examiner (a)

(b)

(a)

(b)

28 GHz peak realized gain vs. air gap, for different housing thicknesses (a)

(b)

(a)

(b)

(a)

(b)

(c)

(a)

(b)

(c)

(a)

(b)

(a)

(b)

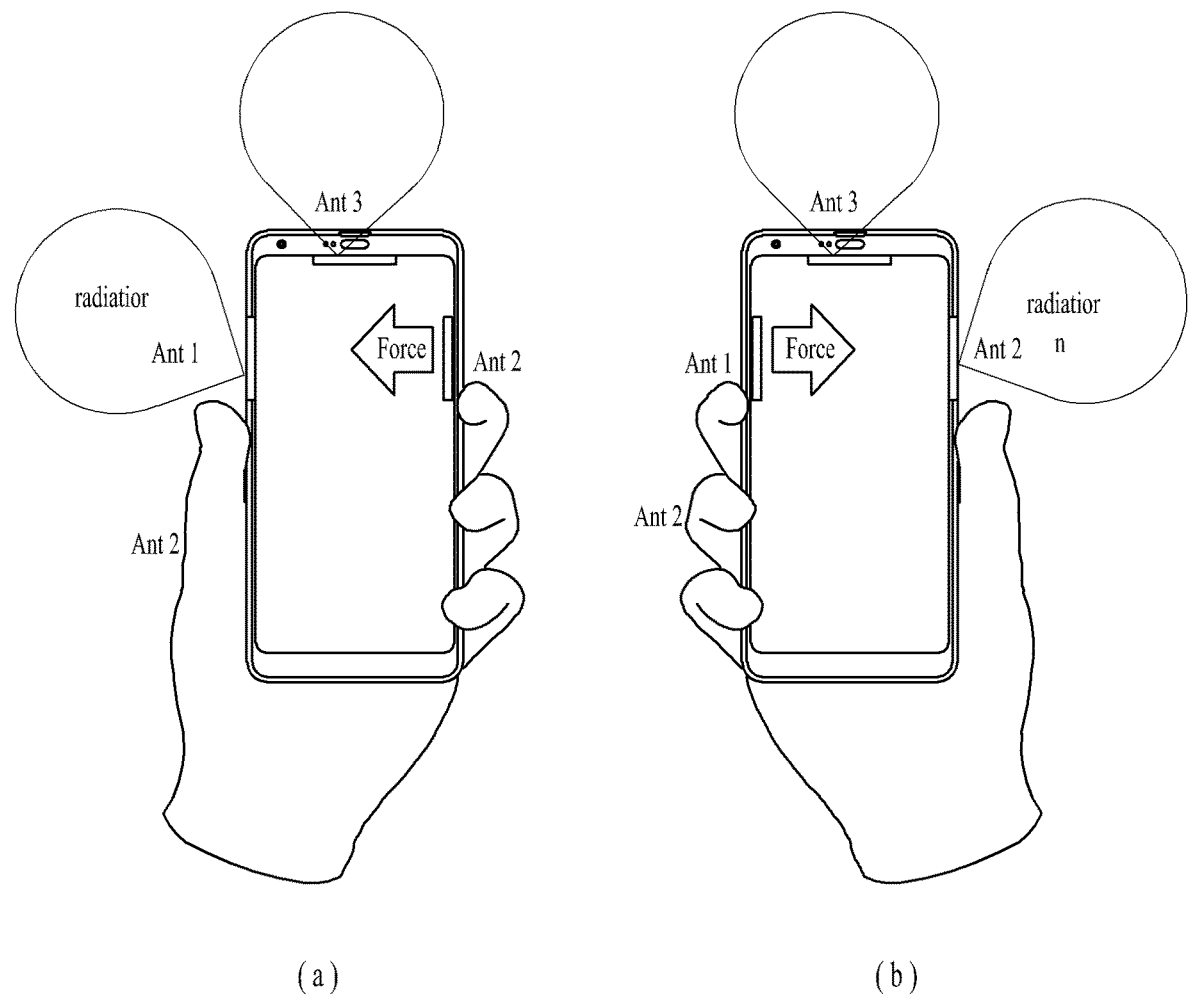

ANTENNA FOR A MOBILE TERMINAL THAT OVERLAPS A SIDE BUTTON

CROSS REFERENCE TO RELATED APPLICATION

This application is the National Phase of PCT International Application No. PCT/KR2019/013708, filed on Oct. 18, 2019, which is hereby expressly incorporated by reference into the present application.

TECHNICAL FIELD

The present disclosure relates to a mobile terminal that is provided with a button and an antenna capable of realizing mmWave wireless communication.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

A display device is a device having a function of receiving, processing, and displaying a video that a user may watch. For example, the display device receives a broadcast selected by the user from broadcast signals transmitted from a broadcasting station, separates a video signal from the received signals, and displays the separated video signal on a display.

In recent years, because of a development of a broadcasting technology and a network technology, functions of the display device have also been considerably diversified, and a performance of the device has been improved accordingly. That is, the display device has been developed to provide not only broadcast contents but also various other contents to the user. For example, the display device may provide game play, music listening, internet shopping, user customized information, and the like using various applications as well as programs received from the broadcasting station. In order to perform such extended functions, the display device may be basically connected to other devices or networks using various communication protocols, and may provide the user with a ubiquitous computing environment. In other words, the display device has evolved into a smart device that enables connectivity to a network and continuous computing.

As display devices have evolved into smart devices, various types of wireless communication technology are applied. In addition, a mobile communication scheme such as LTE requires multiple antennas in order to satisfy performance requirements and meet the standards of various operators. Therefore, the number of antennas mounted in a mobile terminal is increasing.

Wireless communication technology for antennas is affected by metal or electronic components located in the vicinity thereof. Therefore, there are constraints on the arrangement of antennas, and thus it is difficult to mount multiple antennas.

DISCLOSURE

Technical Task

An object of the present disclosure is to provide a mobile terminal having a structure in which antennas are disposed so as to overlap buttons in order to secure space for mounting an antenna for mm Wave wireless communication.

Technical Solutions

It should be understood that specific embodiments set forth herein are given by illustration only.

DESCRIPTION OF DRAWINGS

FIG. 15 is a view for explaining a method of controlling an antenna module using a user input module in the mobile terminal of the present disclosure.

BEST MODE FOR DISCLOSURE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
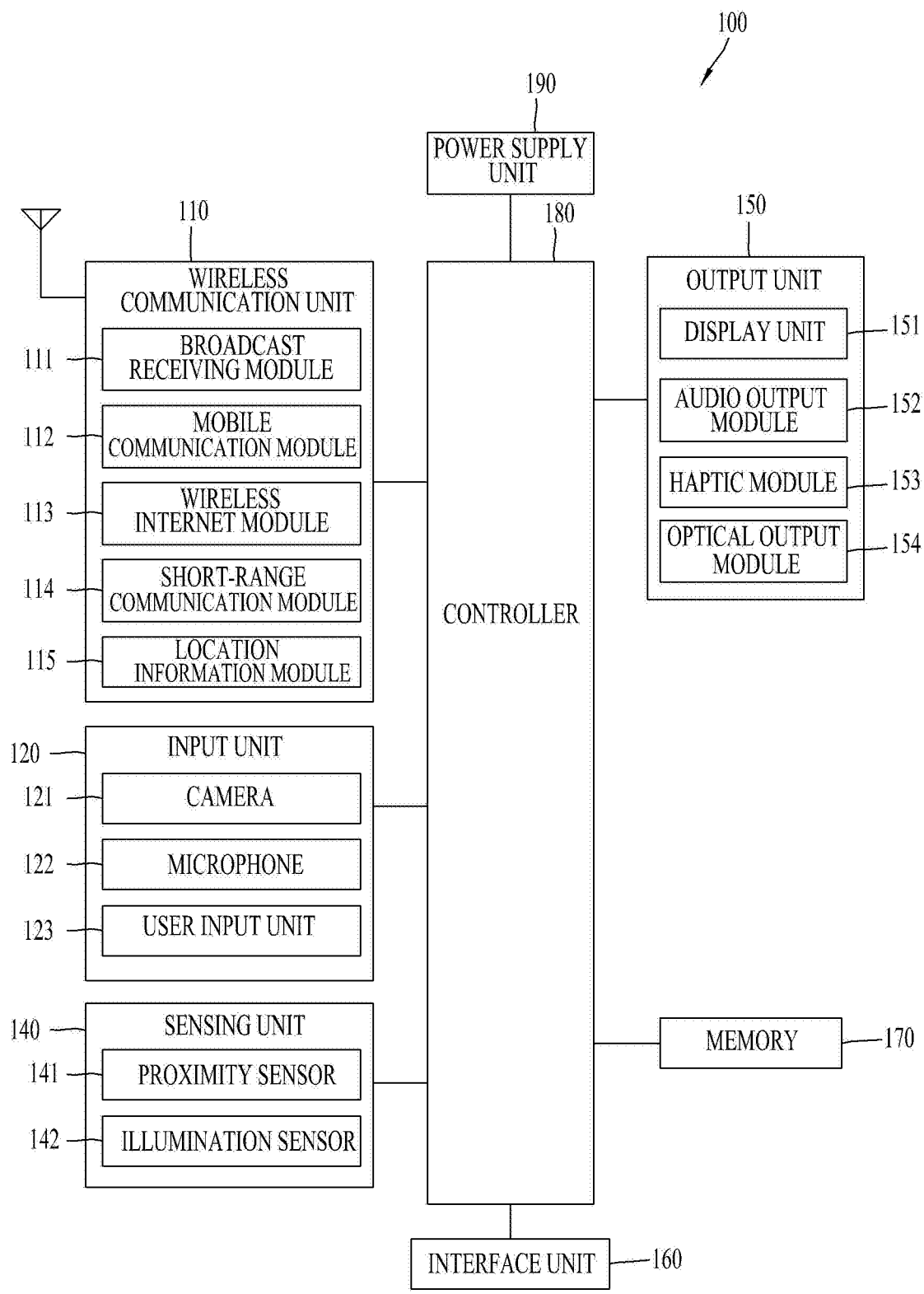
FIG. 1 is a block diagram of a mobile terminal according to the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in FIG. 1 is not a requirement, and that greater or fewer components may alternatively be implemented than the components listed above.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed as a user's control command.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Hereinafter, referring to FIG. 1, the components mentioned above will be described in detail before describing the various embodiments which are realized by the mobile terminal 100 in accordance with the present disclosure.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 may be provided with the power supplied by an external power source and the power supplied therein under the control of the controller 180 so as to supply the needed power to each of the components. The power supply unit 190 may include a battery. The battery may be a built-in type which is rechargeable and detachably loaded in the terminal to be charged.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2:
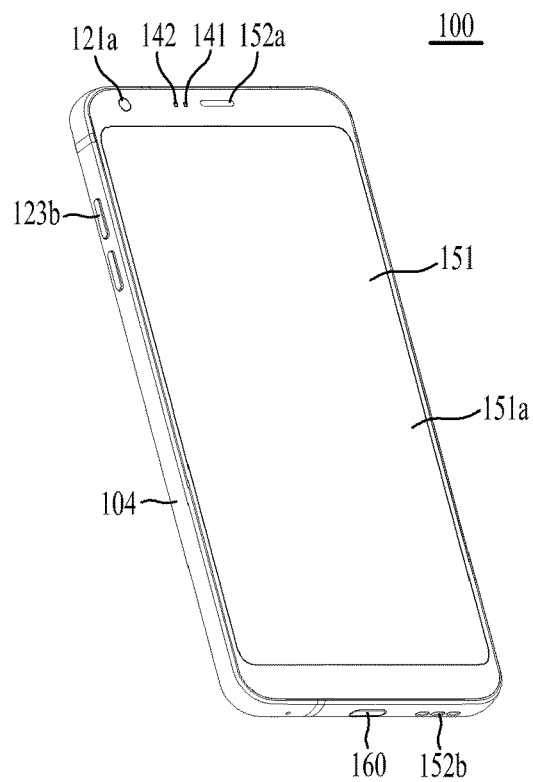
FIGS. 2 and 3 are perspective views of the mobile terminal according to the present disclosure when viewed from the front and the rear.
Figure 3:
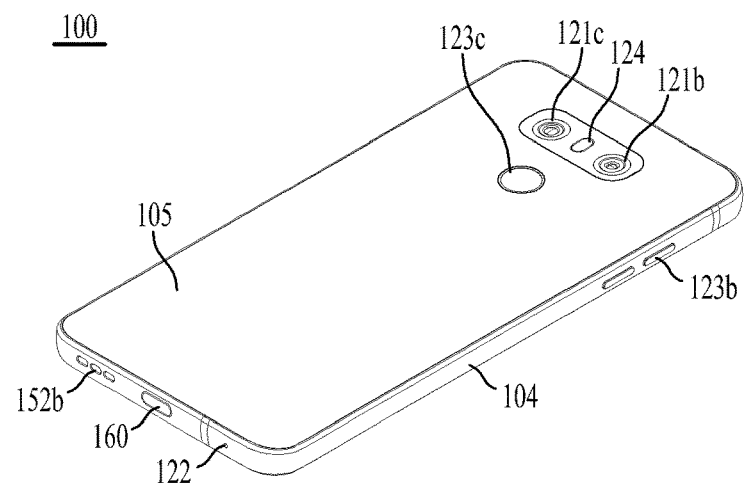

Referring now to FIGS. 2 and 3, the mobile terminal 100 is described with reference to a bar-type terminal body. However, the mobile terminal 100 may alternatively be implemented in any of a variety of different configurations. Examples of such configurations include folder-type, flip-type, slide-type, swing-type, swivel-type, foldable type, and rollable type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to a concept referring to the mobile terminal 100 viewed as at least one assembly.

The mobile terminal 100 will generally include a case (for example, frame, housing, cover, and the like) forming the appearance of the terminal. In this embodiment, the case is formed using a front case and a rear case 105. Various electronic components are incorporated into a space formed between the front case and the rear case 105. At least one side case 104 may be additionally positioned between the front case and the rear case 105.

The display unit 151 is located on the front side of the terminal body to output information. As illustrated, the front case may be omitted, and a window 151*a*, which covers the front surface of the display unit 151, may form the front surface of the terminal body.

In some embodiments, electronic components may also be mounted to the rear case 105. Examples of such electronic components include a detachable battery, an identification module, a memory card, and the like. Rear cover is shown covering the electronic components, and this cover may be detachably coupled to the rear case 105. Therefore, when the rear cover is detached from the rear case 105, the electronic components mounted to the rear case 105 are externally exposed.

As illustrated, when the rear cover is coupled to the rear case 105, a side surface of the rear case 105 is partially exposed. In some cases, upon the coupling, the rear case 105 may also be completely shielded by the rear cover. In some embodiments, the rear cover may include an opening for externally exposing a camera 121*b* or an audio output module 152*b*.

The cases 101 and 105 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the side case 104, between the front case 101 and the rear case 105, or between the rear case 105 and the rear cover, to hermetically seal an inner space when those cases are coupled.

The mobile terminal 100 may include the display unit 151, the first and second audio output modules 152*a* and 152*b*, the proximity sensor 141, the illuminance sensor 142, the optical output module 154, the first and second cameras 121*a* and 121*b*, the first and second manipulation units 123*a* and 123*b*, the microphone 122 and the interface unit 160.

It will be described for the mobile terminal as shown in FIGS. 2 and 3. The display unit 151, the first audio output module 152*a*, the proximity sensor 141, an illumination sensor 142, the optical output module 154, the first camera 121*a* and the first manipulation unit 123*a* are arranged in front surface of the terminal body, the second manipulation unit 123*b*, the microphone 122 and interface unit 160 are arranged in side surface of the terminal body, and the second audio output modules 152*b* and the second camera 121*b* are arranged in rear surface of the terminal body.

It is to be understood that alternative arrangements are possible and within the teachings of the instant disclosure. Some components may be omitted or rearranged. For example, the first manipulation unit 123*a* may be located on another surface of the terminal body, and the second audio output module 152*b* may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 2 illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown located adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1) may be retractable into the terminal body. Alternatively, an antenna may be formed using a film attached to an inner surface of the rear cover, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover is shown coupled to the rear case 102 for shielding the battery 191, to prevent separation of the battery 191, and to protect the battery 191 from an external impact or from foreign material. When the battery 191 is detachable from the terminal body, the rear case 105 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 4:
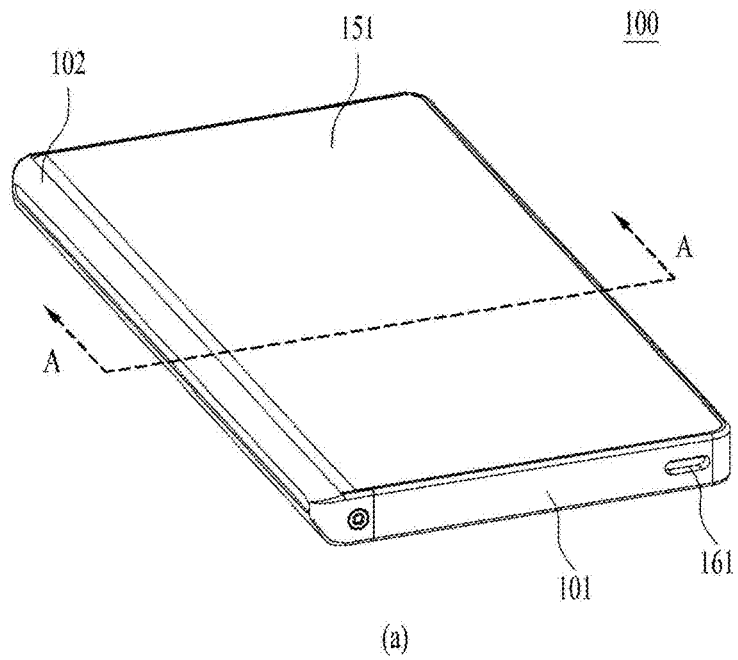
FIGS. 4 and 5 are a front perspective view and a rear view showing a first state and a second state of the mobile terminal according to the present disclosure.
Figure 4:
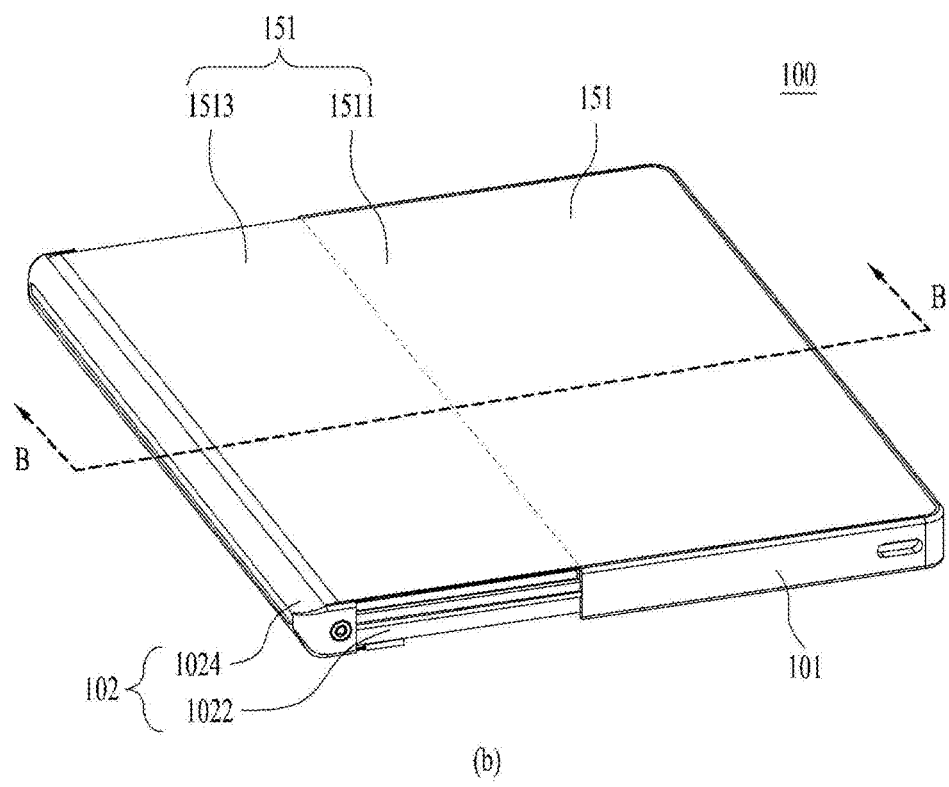
Figure 5:
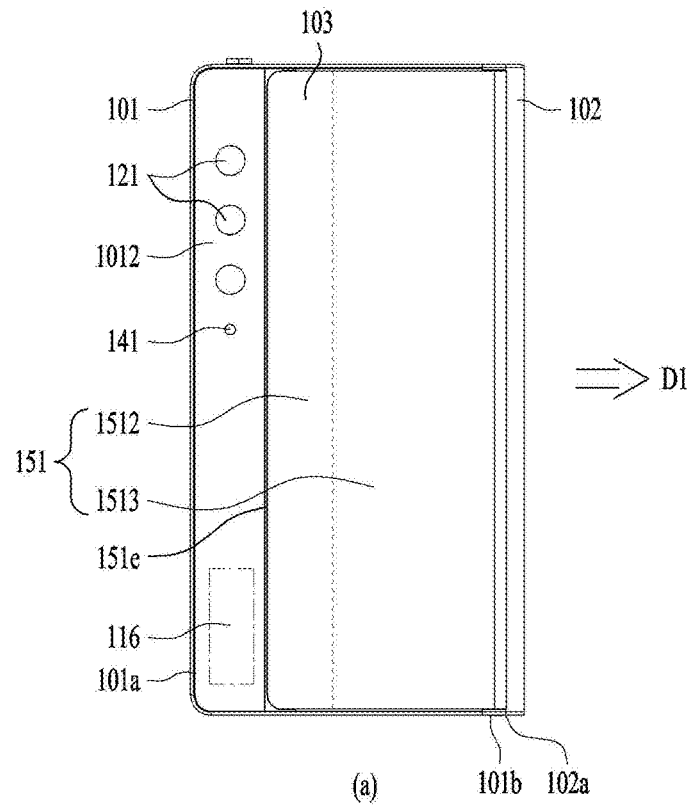
Figure 5:
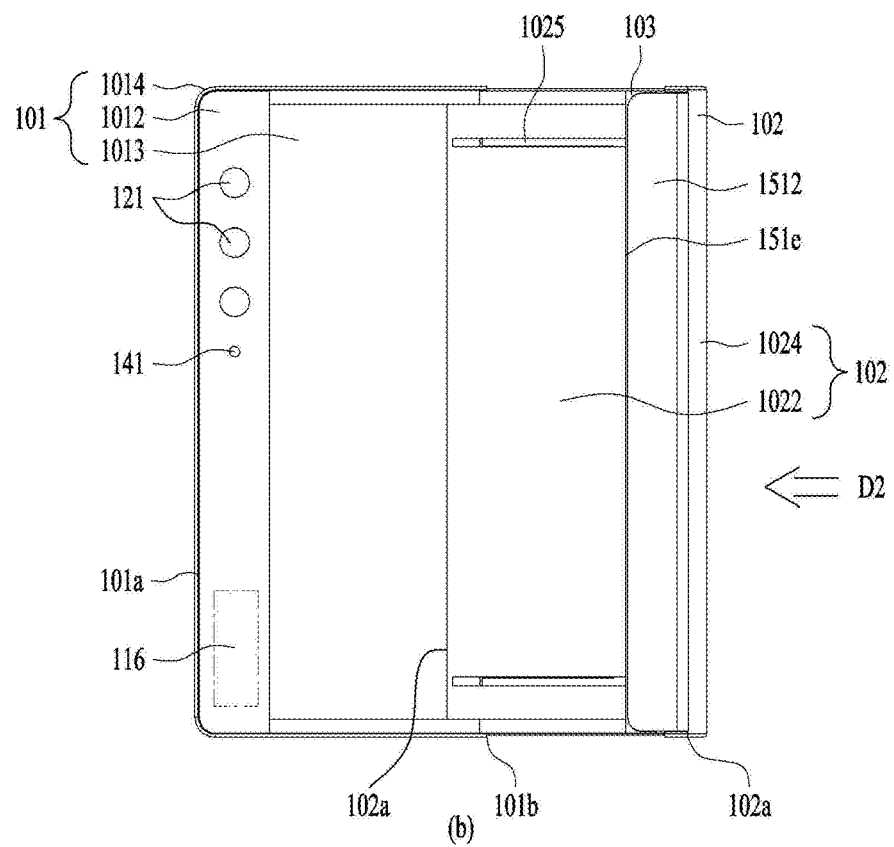

FIGS. 4 and 5 are a front perspective view and a rear view showing a first state and a second state of the mobile terminal 100 according to the present disclosure. The mobile terminal 100 of this embodiment is characterized in that the size thereof is capable of being increased and decreased in the first direction. The contracted state shown in FIG. 4(a) or 5(a) will be referred to as a "first state", and the extended state shown in FIG. 4(b) or 5(b) will be referred to as a "second state".

As illustrated in FIGS. 5(a) and 6(a), a mobile terminal 100 of a first state is contracted and has a size smaller than that of the mobile terminal 100 of a second state. Moreover, a size of a display 151 located on a front surface of the mobile terminal 100 becomes smaller than that in a second state. On the other hand, the mobile terminal 100 of the first state is extended in a first direction so as to switch to the second state. In the second state, a size of the mobile terminal 100 and a size of the display 151 located on the front surface become greater than those of the first state. In the following description, a direction in which the mobile terminal 100 and the display 151 thereof are extended (or enlarged) is referred to as a first direction, a direction in which the mobile terminal 100 and the display 151 thereof are contracted (or retracted) or reduced is referred to as a second direction, and a direction vertical to the first and second directions is referred to as a third direction.

The mobile terminal 100 of the present disclosure may switch from the first state in which the display 151 is located on the front surface like a bar-type mobile terminal like FIG. 4 (a) to the second state by extending the screen like FIG. 4 (b). In the second state, a size of the display 151 located on the front surface is enlarged and a size of the display 151 located on a rear surface is reduced like FIG. 5 (b). Namely, the display 151 used to be located on the rear surface of the mobile terminal 100 in the first state is moved to the front surface of the mobile terminal 100 in the second state.

Thus, in order for a position of the display to be variable, the display may employ a flexible display unit 151. A flexible display means a display that is light-weighted, easily-unbreakable and heavy-duty display fabricated on a thin and flexible substrate capable of curving, bending, folding, twisting and rolling-up like a paper by maintaining the properties of the existing flat panel display.

Moreover, an electronic paper employs a display technology provided with the features of the normal ink and may differ from the existing flat panel display in using reflective light. The electronic paper may change information by electrophoresis using twist balls or capsules.

In a state that the flexible display unit 151 is not deformed (e.g., a state having an infinite curvature radius: hereinafter a basic state), a display region of the flexible display unit 151 becomes a plane. In a state deformed from the basic state by an external force (e.g., a state having a finite curvature radius: hereinafter a deformed state), the display region may become a curved surface. As illustrated in the drawing, information displayed in the deformed state may become visual information outputted to the curved surface. Such visual information is implemented in a manner that light emittance of subpixels deployed in a matrix form is controlled independently. The subpixel means a minimum unit for implementing a single color.

The flexible display unit 151 may lie not in a flat state but in a curved state (e.g., a top-bottom or right-left curved state) from the basic state. In this case, if an external force is applied to the flexible display unit 151, the flexible display unit 151 may be deformed into a flat state (or a less-curved state) or a more-curved state.

Meanwhile, the flexible display unit 151 may implement a flexible touchscreen by being combined with a touch sensor. If a touch is applied to the flexible touchscreen, the controller 180 (see FIG. 1) may perform a control in response to such a touch input. The flexible touchscreen may be configured to sense a touch input in the deformed state as well as in the basic state.

The touch sensor senses a touch (or a touch input) applied to the touchscreen using at least one of various touch types such as a resistance layer type, an electrostatic capacitance type, an infrared type, an ultrasonic type, etc.

For example, a touch sensor may be configured to convert a pressure applied to a specific portion of a touchscreen or a variation of electrostatic capacitance generated from the specific portion into an electric input signal. A touch sensor may be configured to detect a position or size of the touch sensor touched by a touch target applying a touch to a touchscreen, a pressure of the touch, an electrostatic capacitance of the touch, etc.

Meanwhile, a deformation sensing means for sensing deformation of the flexible display unit 151 may be provided to the mobile terminal 100. Such a deformation sensing means may be included in the sensing unit 140 (see FIG. 1).

The deformation sensing means is provided to the flexible display unit 151 or the case (or housing) (i.e., first to third frame 101 to 103 described later), thereby sensing information related to deformation of the flexible display unit 151. Here, the information related to the deformation includes a deformed direction of the flexible display unit 151, a deformed extent, a deformed position, a deformed time, a restored acceleration of the deformed flexible display unit 151, etc., and may further various kinds of information sensible as the flexible display unit 151 is curved.

Based on the information related to the deformation of the flexible display unit 151 and sensed by the deformation sensing means, the controller 180 may change information displayed on the flexible display unit 151 or generate a control signal for controlling a function of the mobile terminal 100.

The size changes of the display unit 151 on the front and rear surfaces of the mobile terminal according to the state switching (first or second state) of the flexible display unit 151, i.e., the size change of the mobile terminal 100 may be performed manually by a force applied by a user, which is non-limited by the manual way. For example, when the mobile terminal 100 or the flexible display unit 151 is in the first state, it may be deformed into the second state by a command of a user or application without an external force applied by the user. Thus, in order for the flexible display unit 151 to be automatically deformed without such an external force, the mobile terminal 100 may include a driving unit 200 described later.

The flexible display unit 151 of the present disclosure is rolled round a predetermined one of both side parts of the mobile terminal 100, thereby being folded at 180°. Hence, one portion of the display unit 151 is disposed on the front surface of the mobile terminal 100 with reference to such a side part, while the rest is disposed on the rear surface of the mobile terminal 100. Some portion of the display unit 151 located on the front surface of the mobile terminal 100 may be fixed to the front surface not to move, while the rest of the display unit 151 located on the rear surface of the mobile terminal 100 may be provided to be movable on the rear surface.

The display unit 151 may be rolled or unrolled round the side part, whereby a size of the region disposed on the front surface of the mobile terminal 100 may be adjusted by moving a part of the display unit 151 disposed on the rear surface of the mobile terminal 100. Since a size of the flexible display unit 151 is determined and the flexible display unit 151 includes a single continuous body, if a size of the flexible display unit 151 located on the front surface of the mobile terminal 100 is increased, a size of the flexible display unit 151 located on the rear surface of the mobile terminal 100 is decreased. The above-configured display unit 151 may be rolled within the second frame 102 relatively movable to the first frame 101, which will be described later, and more specifically, around a predetermined side part of the second frame 102, and withdrawn (or pulled out) from or inserted (or pushed) into the second frame 102 by being rolled around the second frame 102 along a moving direction of the second frame 102 to adjust the size of the display unit 151 on the front surface of the mobile terminal 100. Such an operation will be described in detail together with other related components of the mobile terminal 100.

Typically, an antenna is disposed in the case or the housing of the mobile terminal 100, but a portion where the antenna is installed in the case or the housing may be limited because of the flexible display unit 151 that covers not only the front face of the mobile terminal 100 but also the rear face thereof. For this reason, the antenna may be implemented on the flexible display unit 151. An antenna on display (AOD) is an antenna in which a transparent film is formed by stacking an electrode layer and a dielectric layer that have patterns engraved thereon, respectively. The antenna on display may be implemented thinner than an antenna implemented using a laser direct structuring (LDS) technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

The mobile terminal 100 of the present disclosure includes a main frame in which components are mounted, and the main frame of the present disclosure may vary in size in the first direction as shown in FIG. 5. One or more frames move relative to each other, and sizes thereof may vary in the first direction. Electronic components are mounted in the main frame, and the flexible display unit 151 is located out of the main frame.

Since the mobile terminal 100 of the present disclosure includes the flexible display unit, the flexible display unit 151 may be combined in a form surrounding a front face and a rear face of the main frame. The main frame may include first to third frames 101 to 103. The main frame may include the first frame 101, the second frame 102 moving in the first direction with respect to the first frame 101, and the third frame 103 moving in the first direction with respect to the second frame 102. The first frame 101 and the second frame 102 include front portions, a rear portions, and side portions, respectively, and are coupled to each other. Thus, the mobile terminal 100 may have a hexahedral outer shape by such coupled first and second frames 101 and 102. In consideration of an illustrated configuration of the first to third frames 101 to 103, movements of the second and third frames 102 and 103 may be a slide movement.

First of all, the first frame 101 corresponds to a main body of the mobile terminal 100 and may form a space inside to receive various parts therein. And, the first frame 101 may receive the second frame 102, which is movably coupled to the first frame 101, within such a space. The first frame 101 may include a first front part disposed on the front surface of the mobile terminal 100 and first and second rear parts (not shown) and 1012 disposed on the rear surface of the mobile terminal 100.

As parts of the mobile terminal 100, the controller 180 and the power supply unit 190 may be received in the space within the first frame 101. For example, the controller 180 may include a circuit board including a processor and electronic circuit for controlling operations of the mobile terminal 100 and the power supply unit 190 may include a battery and related parts. Moreover, the second frame 102 and the driving unit 200 described alter may be received in the first frame 101 as well.

As described above, the display unit 151 has the continuous body, and thus, may be disposed on both the front face and the rear face of the mobile terminal 100 while being rolled in the mobile terminal 100. The display unit 151 may include the front face positioned at the front face of the mobile terminal 100, the rear face positioned at the rear face of the mobile terminal 100, and the side face positioned between the front face and the rear face thereof and surrounding the side face of the mobile terminal. The front face and the rear face of the display unit 151 are flat, and the side face of the display unit 151 may form a curved face. When the flexible display unit 151 may be damaged when being bent. Thus, the flexible display unit 151 may be formed to be bent with a predetermined curvature.

The display unit 151 may be divided into a fixed portion and a variable portion. The fixed portion means a portion fixed to the frame. Because of being fixed to the frame, the fixed portion maintains a constant shape without changing a bending degree. On the other hand, the variable portion means a portion in which a bending angle or a position of the bent portion changes. The variable portion in which the position or bending angle of the bent portion changes requires a structure for supporting a rear face of the variable portion in response to the change.

A first region of the display unit 151 may be coupled to the first front portion corresponding to the front face of the mobile terminal 100.

On the other hand, as well illustrated in FIG. 5, for the installation of various physical input units 120 and sensor units 140 for manipulations of the mobile terminal 100, the display unit 151 may be disposed on the second rear part 1013 only. Since the first rear part 1012 is always exposed externally, the input unit 120 such as various buttons, switches, the camera 121 and a flash and the sensor unit 140 such as the proximity sensor 141 may be disposed on the first rear part 1012. A typical bar-type terminal includes a display unit provided to a front surface of the terminal only. Hence, a camera is disposed on a rear surface of the terminal in order to capture an image by viewing a thing located at the opposite side of a user through a display unit. In order for the user to capture himself by viewing himself through the display unit, an additional camera needs to be provided to the front surface of the terminal.

Yet, according to the mobile terminal 100 of the present disclosure, the display unit 151 is located on both of the front and rear surfaces thereof. Therefore, when a user takes a selfie, the display unit located on the same side of the camera 121, i.e., a portion of the display unit 151 located on the rear surface of the mobile terminal 100 in the drawing may be used. When a thing at the opposite side of the user is captured, the display unit located on the opposite side of the camera 121, i.e., a portion of the display unit 151 on the front surface of the mobile terminal 100 in the drawing may be used. For that reason, the mobile terminal 100 may capture a thing located at the opposite side of a user or a selfie using the single camera 121. The camera may include a plurality of cameras of different view angles such as a wide angle, a super wide angle, a telescope, etc. A proximity sensor, an audio output module and the like may be located on the first rear part 1012 as well as the camera, and an antenna 116 may be installed thereon.

The lateral part 1014 may be elongated along edges of the first front part and the first/second rear part 1012/1013 to enclose a circumference of the first frame 101 and form an exterior of the mobile terminal 100. Yet, as mentioned above, since the second frame 102 is received in the first frame 101 and movably coupled thereto, a portion of the first frame 101 needs to be open to allow the relative movement of the second frame 102 to the first frame 101.

Since the second frame 102 is movably coupled to one of both side parts of the first frame 101, the lateral part 1014 is not formed at such a side part, thereby opening it. Hence, the first frame 101 may include a first side part 101a substantially closed and a second side part 101b disposed to oppose the first side part 101a so as to be open. Since the lateral part 1014 is exposed from the mobile terminal 100, the interface unit 160 for connecting to a power port or an earphone jack or the user input unit 123 such as a volume button and the like may be disposed thereon. In case of containing metal substance, the lateral part 1014 may play a role as an antenna.

The second rear portion 1013 of the first frame 101 may be covered by the display unit, but may be disposed on the front face of the display unit using a transparent material.

Moreover, the display unit 151 may be folded at 180° while being rolled up within the second frame 102 so as to be disposed on both of the front and rear surfaces of the mobile terminal 100. For such arrangement of the display 151, the second frame 102 may include a roller rotatably disposed therein. The roller may be disposed at a random position within the second frame 102. Yet, the display 151 should be spread flat on the front and rear surfaces of the mobile terminal 100 to provide a user with a screen of a good quality. For such a spread, an appropriate tension should be provided to the display 151. In order to provide the proper tension, the roller may be disposed at a first directional end of the second frame 102. The roller may extend in the third direction, and may be rotatably coupled to the second frame 102.

The display unit 151 may be rolled around the roller by being gradually curved with a predetermined curvature. Moreover, the roller may be installed to freely rotate on the second frame 102 by contacting with an inner surface of the display unit 151. Therefore, the roller is substantially capable of moving the display unit 151 in a direction vertical to a lateral direction, i.e., a length direction of the mobile terminal 100. As described later, when the second frame 102 is slid, the display unit 151 is moved by the tension applied by the second frame 102 to the front or rear surface of the mobile terminal 100 relatively to the second frame 102 in a different direction (i.e., the first direction or the second direction). In doing so, such a movement may be guided by the roller that is rotating.

In addition, the roller is disposed on a first side portion of the second frame 102, and the first side portion actually corresponds to an outermost side portion of the mobile terminal 100. When the first side portion of the second frame 102 is exposed, the display unit 151 rolled on the roller may be damaged. Accordingly, the second frame 102 may include a side frame 1024 disposed on the first side portion.

The side frame 1024 extends in the longitudinal direction of the second frame 102 to cover the first side portion, thereby protecting the roller and the display unit 151 rolled thereon. That is, the side frame 1024 covers the side face of the display unit 151, and the side face thereof is located in the third region. The first to third regions are at specified positions on the flexible display unit and do not change in size or position, but the sizes of the front face and the rear face, and the position of the side face are determined based on the state of the main frame.

The first region and the second region correspond to the fixed portion described above, and the third region corresponds to the variable portion described above.

The third region may vary in position depending on the state of the mobile terminal. Because the side face is rolled by the roller, the side face is bent with the predetermined curvature, and an inner face of the side frame may include a curved face corresponding to the curvature of the side face.

Because of the side frame 1024, the second frame 102 may have the substantially closed first side portion, and the side frame 1024 may substantially form the outer shape of the mobile terminal 100 together with the side face 1014 of the first frame 101. In addition, the second frame 102 may include a second side portion 102b that is disposed opposite the first side portion to minimize interference with the components within the first frame 101 during the movement, and is opened.

Such a second frame 102 is movably coupled to the first frame 101, and thus may slide in the predetermined first or second direction relative to the first frame 101. More specifically, the second frame 102 may be movably coupled to the first frame 101 through the side portion of the first frame 101, more precisely, through the opened second side portion 101b, as shown. More specifically, the second side portion 102b of the second frame is disposed relatively adjacent to the first side portion 101a of the first frame 101 which is closed. Accordingly, the first side portion of the second frame may be disposed to be opposite to the first side portion 101a. Accordingly, the second side portion 102b is inserted into the first frame 101 through the side portion of the first frame, that is, the second side portion 101b thereof. The first side portion is not inserted into the first frame 101 but is always located outside the first frame 101, thereby forming the outer shape of the mobile terminal 100 as described above. However, when necessary, such first side portion 102b of the second frame 102 may also be inserted into the first frame 101.

Because of such positional relationship, the second frame 102 may extend from or contract to the first frame 101 in a direction perpendicular to the longitudinal direction of the mobile terminal 100 or the first frame 101. That is, the first and second directions may basically be directions perpendicular to the longitudinal direction of the mobile terminal 100 or the first frame 101. Further, the first and second directions may also be described as the lateral direction or the horizontal direction of the mobile terminal 100 or the first frame 101. In addition, during the movement in the first direction, the second frame 102 extends from the first frame 101. Accordingly, the first direction may be a direction in which the second frame 102 moves away from the first frame 101, that is, moves outwardly of the mobile terminal 100 or the first frame 101. On the other hand, during the movement in the second direction, the second frame 102 contracts to the first frame 101. Thus, the second direction is a direction opposite to the first direction, so that the second direction may be a direction in which the second frame 102 moves to become closer to the first frame 101, that is, moves inwardly of the mobile terminal 100 or the first frame 101. When being moved in the first direction, such second frame 102 extends and applies a force to the portion of the display unit 151 disposed on the rear face of the mobile terminal 100, so that the portion of the display unit 151 may be disposed on the front face of the mobile terminal 100, and a region for such additional arrangement may be defined. Thus, the second frame 102 may convert the mobile terminal 100 into the second state with the display unit 151 with the relatively extended front face by moving in the first direction. On the other hand, when being moved in the second direction, the second frame 102 contracts into an original state thereof, and applies a force to the portion of the display unit 151 disposed on the front face of the mobile terminal 100 to return to the rear face of the mobile terminal 100 again. Thus, the second frame 102 may convert the mobile terminal 100 into the first state with the display unit 151 with the relatively contracted front face by moving in the second direction. Accordingly, the second frame 102 selectively exposes the display unit 151 to the front face of the mobile terminal 100 depending on the moving direction (i.e., the first or second direction). Accordingly, the mobile terminal 100 may be converted into the first or second state defined above.

The third rear portion 1022 of the second frame 102 may be disposed below the second rear portion 1013 of the first frame 101. That is, the front face of the third rear portion 1022 may face the rear face of the second rear portion 1013. In addition, the rear face of the second rear portion 1013 may be in contact with the front face of the third rear portion 1022 to stably support the movement of the second frame 102. Because of such arrangement, the third rear portion 1022 may be exposed to the outside of the first frame, more precisely, of the second rear portion 1013, and may be coupled to the display unit 151.

Alternatively, when the second rear portion 1013 is made of a transparent material, the second rear portion 1013 may form an outer shape of the rear face of the mobile terminal. The second rear portion 1013 may be positioned rearward of the third rear portion 1022 of the second frame, and the flexible display unit may be disposed between the second rear portion 1013 and the third rear portion 1022 in the first state.

When the second rear portion 1013 is made of a material such as a transparent glass to form the outer shape of the rear face of the mobile terminal, the first rear portion 1012 may be implemented using the same member as the second rear portion 1013. That is, the camera 121, the flash or the sensing unit 140, and the like may be arranged by partially coating the plate-shaped member of the transparent glass material to not allow the internal components to be visible and by not coating only a required portion.

The first region 1511 may be disposed on the front face of the mobile terminal 100, more specifically, the first frame 101, that is, on the front face of the first front portion. The first region 1511 is fixed to the first frame 101, that is, the front face of the first front portion so as not to be moved during the movement of the second frame 102, and thus, the first region 1511 may always be exposed to the front face of the mobile terminal 100. The third region 1513 may be adjacent to the first region 1511, and may extend into the second frame 102 and rolled on the roller. The third region 1513 may consecutively extend out of the second frame 102 again and partially cover the second frame 102, that is, the rear face of the third rear portion 1022. Further, the second frame 102, that is, the third rear portion 1022, is adjacent to the first frame 101, that is, the second rear portion 1013 and together forms the rear case of the mobile terminal 100, so that it may be described that the third region 1513 is also disposed on the rear face of the first frame 101.

The second region 1512 may be adjacent to the third region 1513 and may be disposed on the rear face of the mobile terminal 100, more specifically, on the second frame, that is, the rear face of the third rear portion 1022 thereof. The second region 1512 may be coupled to the third frame 103 without being directly coupled to the second frame 102. As shown in FIG. 5 (*b*), the slot 1025 extending in the lateral direction (i.e., the direction perpendicular to the longitudinal direction of the mobile terminal 100) to the second frame 102, that is, to the third rear portion 1022 is defined. Further, the third frame 103 may move along the slot 1025. In FIG. 5 (*b*), it is shown that the slot 1025 is defined in the rear face of the second frame 102, but may be defined in the side face of the second frame 102. Although the second region 1512 may move in the first or second direction with respect to the second frame 102 together with the third frame 103, the movement of the second region 1512 may be restricted within the rear face of the mobile terminal 100 by the slot 1025. That is, the second region 1512 does not move out of the second frame 102 even when the second frame 102 is extended or contracted, and may move along the slot 1025 within the second frame 102 by the extended or contracted distance of the second frame 102. Accordingly, the second region 1512 may always be exposed to the rear face of the mobile terminal 100.

As a result, the first region 1511 may be disposed on the front face of the mobile terminal 100 and may be always exposed to the front face regardless of the movement of the second frame 102, and the second region 1512 may be disposed on the rear face of the mobile terminal 100 and may be always exposed to the rear face regardless of the movement of the second frame 102. In addition, the third region 1513 may be disposed between the first and second regions 1511 and 1512, and may be selectively placed on the front face or the rear face of the mobile terminal 100 depending on the moving directions of the second frame 102.

Because of such selective placement of the third region 1513, as shown in FIG. 5(b), the second rear portion 1013 of the first frame 101 is covered by the second and third regions 1512 and 1513 and the third rear portion 1022 of the display unit 151 in the first state, but the third region 1513 moves to the front face of the mobile terminal 100 in the second state, and the third rear portion 1022 also moves in the first direction, so that the mobile terminal 100 may be exposed to the outside. In addition, the second front portion 1021 of the second frame 102 is disposed below the first front portion of the first frame 101 in the first state, but is moved out of the first frame 101 and supports the third region 1513 of the display unit 151 disposed on the front face of the mobile terminal 100 in the second state.

Since the first and second regions 1511 and 1512 are always respectively arranged on the front face and the rear face of the mobile terminal 100, curvatures of the first region 1511 and the second region 1512 do not change, and the first region 1511 and the second region 1512 may be maintained in a flat basic state. However, the third region 1513 may be rolled on the roller and bent in the second frame 102. When converting from the first state to the second state, the third region 1513 may extend from the second frame 102 to the front face of the mobile terminal 100 while being rolled on the roller in one direction. On the other hand, when converting from the second state to the first state, the third region 1513 may be retracted from the front face of the mobile terminal 100 to the second frame 102 while being rolled on the roller in the opposite direction, and at the same time, may return to the rear face of the mobile terminal 100 from the second frame 102. A specific location of the foldable mobile terminal in a form of being spread like a book is easily damaged because only the specific location is folded repeatedly. On the other hand, the deformed portion of the flexible display unit 151, that is, a portion rolled on the roller, may vary based on the first and second states of the mobile terminal 100, that is, the movement of the second frame 102. Accordingly, the mobile terminal 100 of the present disclosure may significantly reduce deformation and fatigue repeatedly applied to a specific portion of the display unit 151, thereby preventing damage to the display unit 151.

Based on the above-described configuration, overall operations of the mobile terminal 100 will be described as follows. As an example, the state conversion may be performed manually by the user, and an operation of the mobile terminal 100 during such manual state conversion will be described. However, operations of the first to third frames 101 to 103 and the display unit 151, which will be described below, may be performed in the same manner when a power source other than a user's force is used, for example, when the driving unit 200 to be described below is applied.

As shown in FIGS. 4A, and 5A, the second frame 102 is fully retracted into the first frame 102 in the first state. Therefore, only the first region 1511 of the display unit 151 fixed to the front face of the first frame 101 may be exposed to the front face of the mobile terminal 100. Such first region 1511 may be fixed and supported to the first frame 101, that is, the first front portion thereof. In addition, a major portion of the third region 1513 may be disposed on the rear face of the mobile terminal 100 together with the second region 1512, and the third region 1513 may be disposed in the second frame 102 while being partially rolled on the roller. The third region 1513 of the rear face of the mobile terminal 100 may be supported by the second frame, that is, the third rear portion 1022 thereof. The second region 1512 may be fixed by the third frame 103 disposed on the second frame (i.e., the third rear portion 1022) and may be movably coupled to the second frame 1012.

In such first state, when the second frame 102 moves in the first direction, the mobile terminal 100 may be converted into the second state. As shown in FIGS. 4B, and 5B, the second frame 102 may extend from the first frame 101 by the movement in the first direction, and may increase the overall size of the mobile terminal 100, in particular, the front face thereof. During the movement in the first direction, the second frame 102 may apply a force, that is, a tension, to the display unit 151 in the first direction. The display unit 151 is fixed to the first frame 101 but is coupled to the second frame 102 so as to be movable using the third frame 103, so that the force applied by the second frame 102 allows the third region 1513 to be rolled out from the roller of the second frame 102 to the front face of the mobile terminal 100. That is, the third region 1513 may be withdrawn (or pulled out) from the second frame 102 or extend to (or move out of) the second frame 102. At the same time, the third region 1513, particularly, the portion located on the rear face of the third region 1513 may be rolled into the roller of the second frame 102 from the rear face, or may be inserted (or pushed in), retracted, or moved into the second frame 102. Not an entirety of the third region 1513 is withdrawn from the second frame 102 to the front face of the mobile terminal 100, and a portion of the third region 1513 may be disposed in the second frame 102 while still being rolled on the roller. In addition, for the smooth movement of the third region 1513, the second region 1512 may also move in the first direction with respect to the second frame 102 together with the third frame 103. In addition, as described above, the second region 1512 and the third frame 103 may be constrained to the second frame 102 and move in the first direction with respect to the first frame 101 together with the second frame 102.

Accordingly, the second region 1512 and the third frame 103 may move in the first direction relative to the first frame 101 as well as the second frame 102, and accordingly, move a distance longer than the moved distance of the second frame 102. Thus, because of such long distance movement in the first direction of the second region 1512, the third region 1513 may be smoothly extended to the front face of the mobile terminal 100. Further, for the movement of the third region 1513, which is proportional to the expansion of the second frame 102, the movement of the second region 1512 and the third frame 103 in the first direction may be performed simultaneously with the movement of such third region 1512 and second frame 102 in the first direction so as to be proportional to the movement of third region 1513 and second frame 102.

When the second frame 102 is fully extended in the first direction, the first and third regions 1511 and 1513 may be arranged on the front face of the mobile terminal 100, and only the second region 1512 may be disposed on the rear face of the mobile terminal 100. Such first and third regions 1511 and 1513 may be supported by the first frame (i.e., the first front portion thereof) and the second frame (i.e., the second front portion 1021 thereof). In addition, the second frame 102, i.e., the third rear portion 1022 thereof exposes the second rear portion 1013 of the first frame while extending in the first direction, and supports the moving third region 1513. Therefore, in the second state, the mobile terminal 100 may have the extended front face display unit 151.

On the other hand, when the second frame 102 moves in the second direction in the second state, the mobile terminal 100 may again return into the first state as shown in FIGS. 4A, and 5A. The second frame 102 may be contracted to the first frame 101 by the movement in the second direction, and may reduce the overall size of the mobile terminal 100, particularly the front face thereof. The movement of the display unit 151 during such movement of the second frame 102 may be performed in a reverse order of the movement in the first direction described above. In brief, the third region 1513 may be rolled from the front face of the mobile terminal 100 into the roller of the second frame 102, or may be inserted, retracted, or moved into the second frame 102. At the same time, the third region 1513 may be rolled, withdrawn, extended, or moved out of the roller of the second frame 102 to the rear face of the mobile terminal 100. Not the entirety of the third region 1513 may be withdrawn from the second frame 102 to the rear face of the mobile terminal 100, and the portion of the third region 1513 may still be placed in the second frame 102 while still being rolled on the roller. In addition, for such smooth movement of the third region 1513, the second region 1512 may also move in the second direction with respect to the second frame 102 together with the third frame 103. The second region 1512 and the third frame 103 may be constrained to the second frame 102 to move in the second direction with respect to the first frame 101 together with the second frame 102.

Accordingly, the second region 1512 and the third frame 103 may move relatively in the second direction with respect to not only the second frame 102 but also the first frame 101. As a result, the second region 1512 and the third frame 103 may move in the second direction a distance larger than the moved distance of the second frame 102. Thus, because of such long distance movement of the second region 1512, the third region 1513 may be smoothly returned to the rear face of the mobile terminal 100. Further, for the movement of the third region 1513 proportional to the contraction of the second frame 102, the movements of the second region 1512 and the third frame 103 in the second direction may be performed simultaneously with the movements of the third region 1512 and the second frame 102 in the second direction so as to be proportional to the movements of the third region 1513 and the second frame 102. When the second frame 102 is completely contracted in the second direction, the mobile terminal 100 may be converted into the first state as described above, and may have the display unit 151 with the front face that is relatively reduced in comparison with the second state in the first state.

Figure 6:
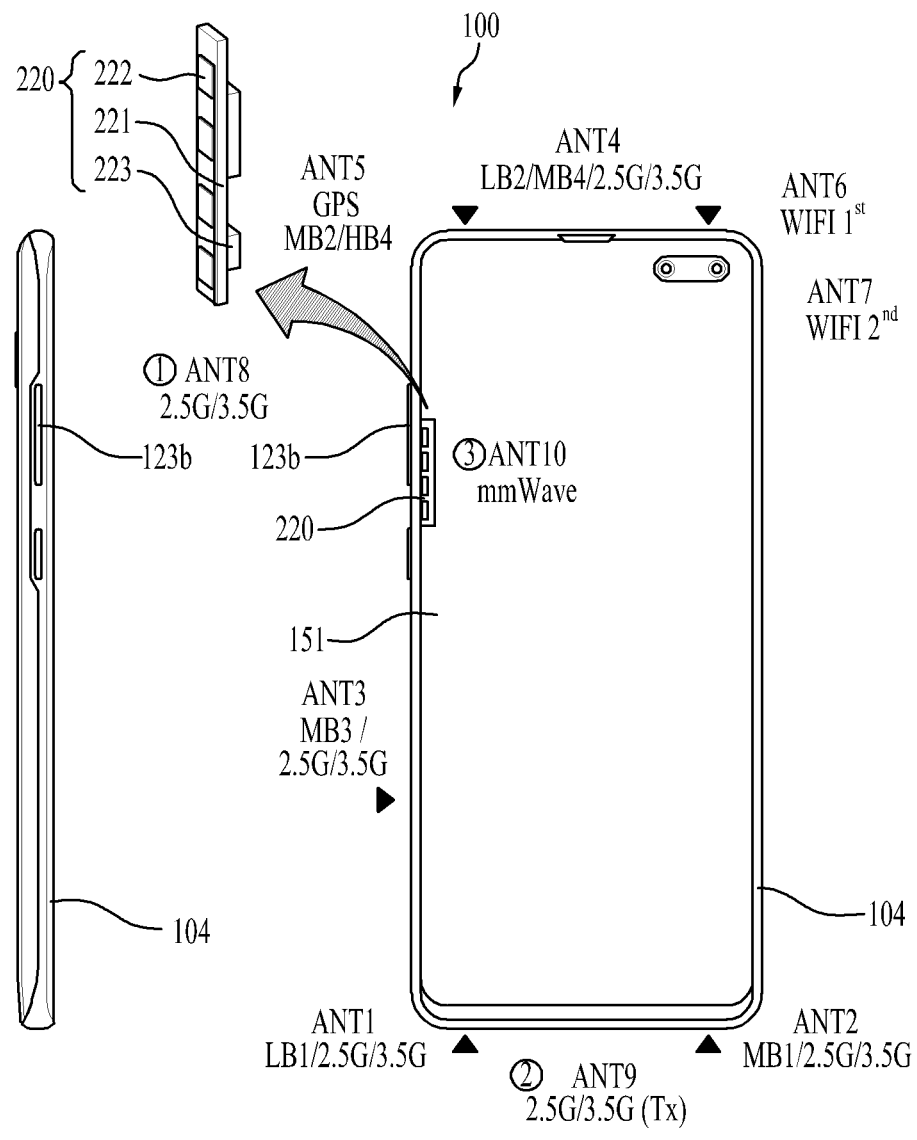
FIG. 6 is a view showing an antenna-mounting space in the mobile terminal shown in FIG. 2.

FIG. 6 is a view showing an antenna-mounting space in the mobile terminal 100 shown in FIG. 2. As shown in FIG. 2, since the display unit 151 is located at the front surface of the bar-shaped mobile terminal 100, antennas are disposed at the side surface portion, rather than the front surface area. The side case 104, which forms the external appearance of the peripheral surface of the mobile terminal 100, may include conductive members, which include metal materials, and a nonconductive material interposed between the conductive members, and may use the conductive members as an antenna radiator.

The side case 104 may be configured such that at least a portion thereof is connected to a metal frame, which is located inside to support the display unit 151 and to provide rigidity to the mobile terminal 100. Since the metal frame serves as a ground for the mobile terminal, the conductive members connected to the metal frame are in the state of being connected to the ground, and serve as an antenna radiator for emitting signals upon application of power thereto from a power supply unit.

As shown in FIG. 6, the antennas using the side case 104 may include a Wi-Fi antenna, a GPS antenna, and an antenna for mobile communication. The antennas may be disposed at other positions, obviating the side case. An antenna for short-distance wireless communication, such as an NFC antenna, is used in a specific situation because the same operates within a distance of 10 cm, and may thus be configured as a coil antenna, and may be disposed at the rear surface of the mobile terminal 100.

At present, a long-term evolution (LTE) antenna is mainly used as an antenna for mobile communication. Because communication companies use signals in different respective frequency bands, a plurality of antennas having different lengths may be provided in order to use signals in various frequency bands. As shown in FIG. 6, an antenna for a low band (LB) and a mid-band (MB) may be included, and thus it is possible to transmit and receive signals of a plurality of frequency bands using a single antenna. An antenna capable of operating in multiple bands may be implemented by connecting a conductive pattern formed by printing a conductive material on the conductive members or by adding a tuning circuit thereto.

Even for signals in the same frequency band, wireless communication may be performed according to a multiple-input multiple-output (MIMO) scheme using a plurality of antennas. The MIMO scheme is a wireless communication scheme that increases a transmission rate by increasing the capacity of wireless communication using a plurality of antennas, and thus the number of antennas is further increased.

With the recent development of a 5G mobile communication scheme, an antenna for 5G mobile communication is further necessary. The 5G mobile communication scheme includes a sub6 scheme using a centimeter wave (cmWave) of a 2.5 GHz band and a cmWave of a 3.5 GHz band and a new radio (NR) scheme using a millimeter wave (mmWave) of 26 GHz or higher. In the former case, since a frequency band that does not largely deviate from the high frequency band of a conventional LTE communication scheme is used, it is possible to implement an antenna using the side case 104, like a conventional LTE antenna.

The conventional antenna using the side case 104 uses a monopole antenna, a dipole antenna, or a slot antenna, whereas the NR antenna uses an array antenna. The array antenna includes a plurality of radiation patches 222 arranged at predetermined intervals, and controls the power applied to each of the radiation patches 222, thereby transmitting and receiving signals in a scheme (a beam-forming scheme) in which the radiation direction is oriented in a specific direction. Therefore, the plurality of radiation patches 222 may be disposed in a row at predetermined intervals on one surface of an antenna substrate 221, and a wireless communication chip 223, which transmits wireless signals through the radiation patches 222, may be mounted on the opposite surface of the antenna substrate 222, without directly using the side case 104.

As shown in FIG. 6, a plurality of antennas ANTT1, ANT2, ANT3, ANT4, ANT8, and ANT9 of a 2.5 GHz band or a 3 GHz band may be provided. A conventional LTE antenna may be utilized by additionally connecting a matching circuit or a branch pattern to the LTE antenna, or sub6 antennas ANT8 and ANT9 may be further provided. There is a limitation on space for providing an NR antenna for mm Wave in addition to nine antennas including the LTE antennas and the sub6 antennas. Therefore, as shown in FIG. 6, in order to minimize interference with other antennas, the NR antenna needs to be disposed so as to overlap a user input module 210 (a side key), which is located on the side surface.

Figure 7:
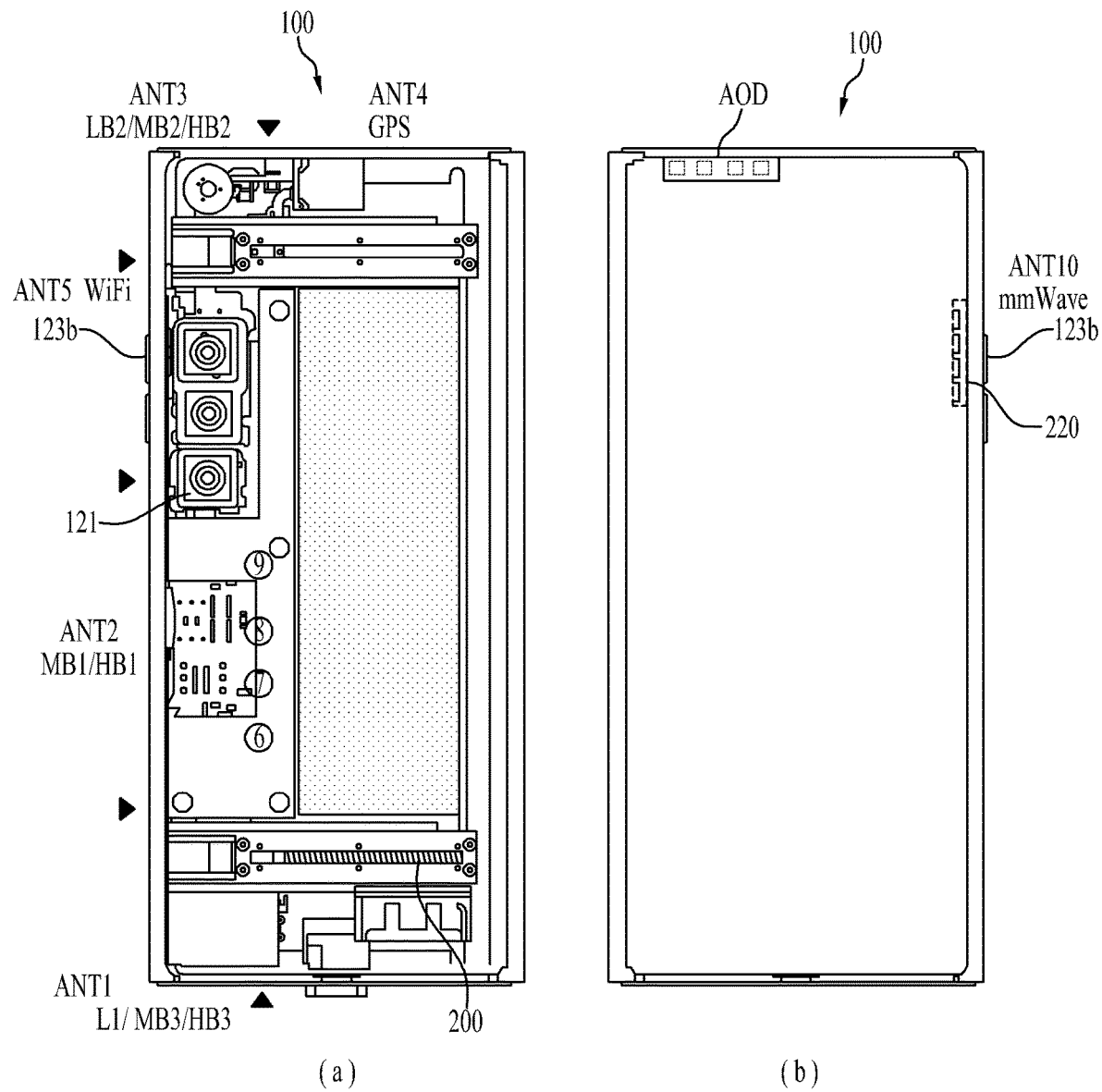
FIG. 7 is a view showing an antenna-mounting space in the mobile terminal shown in FIG. 4.

FIG. 7 is a view showing an antenna-mounting space in the mobile terminal 100 shown in FIG. 4. In the mobile terminal 100 formed such that the flexible display unit 151 occupies one surface thereof, one side surface of the terminal may not be used for an antenna. Therefore, as shown in FIG. 7($a$), only five antennas may be disposed at the side surfaces, and additional antennas may be further disposed at a first rear surface portion, which does not overlap the display unit 151.

Thus, the antenna-mounting space in the mobile terminal 100 configured as shown in FIG. 4 is more restrictive than that in the bar-shaped terminal shown in FIG. 2. Therefore, as shown in FIG. 7($b$), the terminal may employ an antenna-on-display (AOD) configuration in which the radiation patches 222 are superimposed on the display unit 151. In this case, however, the radiation patches 222 superimposed on the display unit 151 may be visible depending on the angle of light, and the performance of the antenna may be deteriorated compared to a conventional substrate-type structure. In addition, because wires for the antenna are additionally provided, the size of a bezel may increase. Therefore, the NR antenna needs to be disposed so as to overlap the user input module 210 disposed on the side surface in order to minimize interference with other antennas. Hereinafter, for convenience of description, the NR antenna, which is disposed so as to overlap the user input module 210 and includes the plurality of radiation patches 222, will be referred to as an "antenna module 220".

Figure 8:
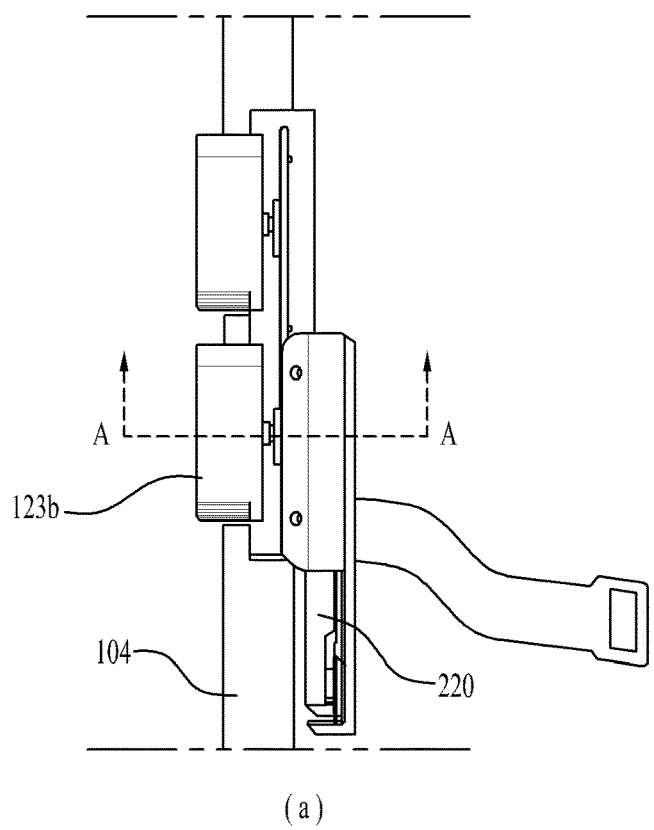
FIG. 8 is a view showing an example of the disposition of an antenna module and a user input module in the mobile terminal.
Figure 8:
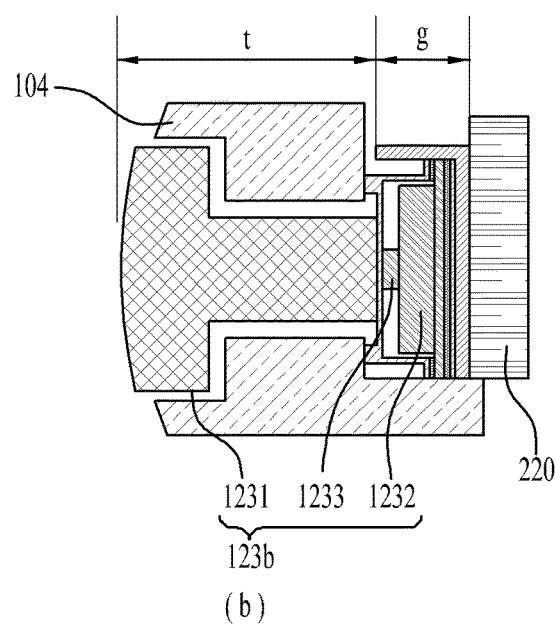

FIG. 8 is a view showing an example of the disposition of the antenna module 220 and the user input unit 123$b$ in the mobile terminal 100. FIG. 8($a$) is a view from above, and FIG. 8($b$) is a cross-sectional view taken along line A-A in FIG. 8($a$). The user input module 210 located at the side surface includes a button part 1231, which is exposed to the outside, and a switch board 1232, which is located further inwards than the button part 1231 and generates a signal. When the button part 1231 is pressed, a switch 1233 of the switch board 1232 is pressed, thereby generating a signal. The user input unit 123 configured as described above needs to be disposed at the outermost portion of the mobile terminal 100. Thus, as shown in FIG. 8($b$), the antenna module 220 may be disposed further inwards than the user input unit 123$b$ so as to overlap the same.

The antenna for mmWave may be disposed such that one surface of an antenna substrate thereof faces the user input module 210 so that the radiation patches 222 are oriented outwards in order to secure radiation performance. There is an advantage in that the antenna module 220 is disposed so as to be spaced apart from other antennas, but there is a problem in that the antenna module 220 overlaps the button in the radiation direction, thus leading to deterioration in antenna performance.

Figure 9:
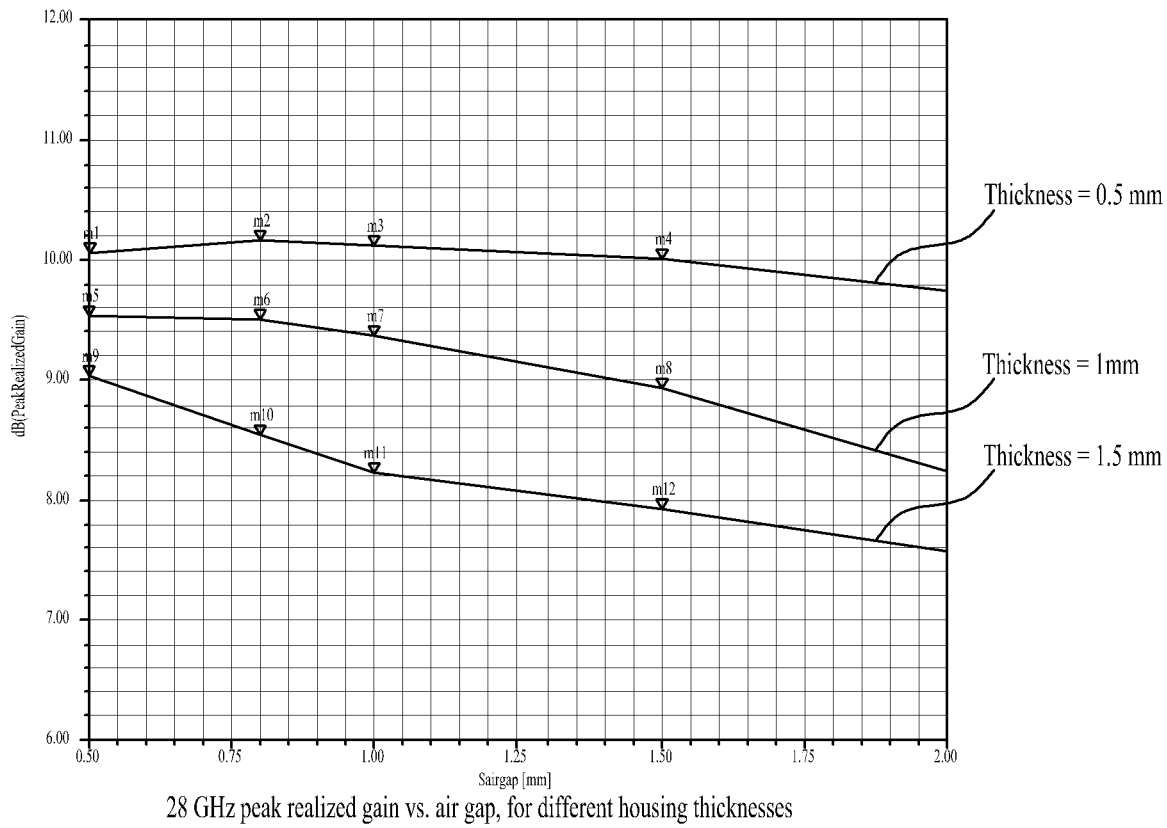
FIG. 9 is a diagram for explaining performance according to the position of an antenna.
Figure 9:
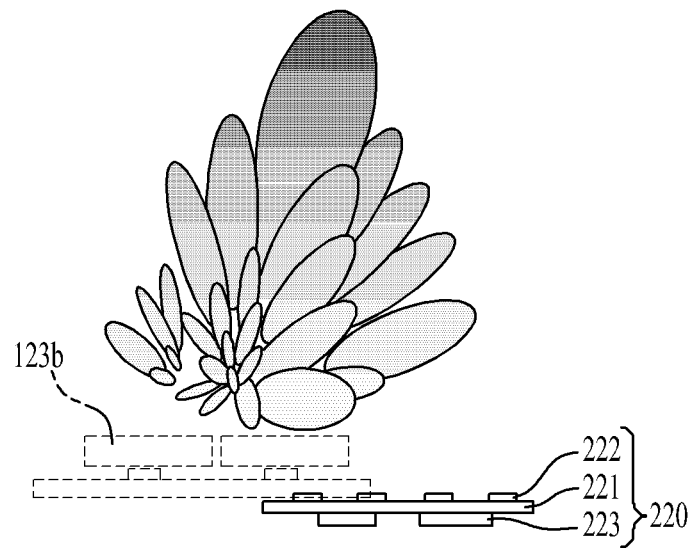

FIG. 9 is a diagram for explaining the performance according to the position of the antenna. FIG. 9($a$) is a graph showing the antenna radiation performance according to the thickness t of the side case 104, which is located on the side surface of the side key, and the size of an air gap between the side case and the antenna module 220. The horizontal axis represents the size of the air gap, and the vertical axis represents the radiation performance. As shown in FIG. 9($a$), as the thickness t of the side case 104 increases, the antenna performance is deteriorated, and as the size of the air gap increases, the radiation performance is deteriorated. Therefore, the antenna module 220 is preferably disposed as far outwards as possible. Particularly, as shown in FIG. 8, when the user input module 210 is disposed in the radiation direction of the antenna module 220, the radiation performance is more strongly affected because the user input module 210 includes a conductive material. As shown in FIG. 9($b$), the radiation performance of the portion that overlaps the user input module 210 is lowered, and thus the size of a beam decreases. Accordingly, performance is further deteriorated.

Figure 10:
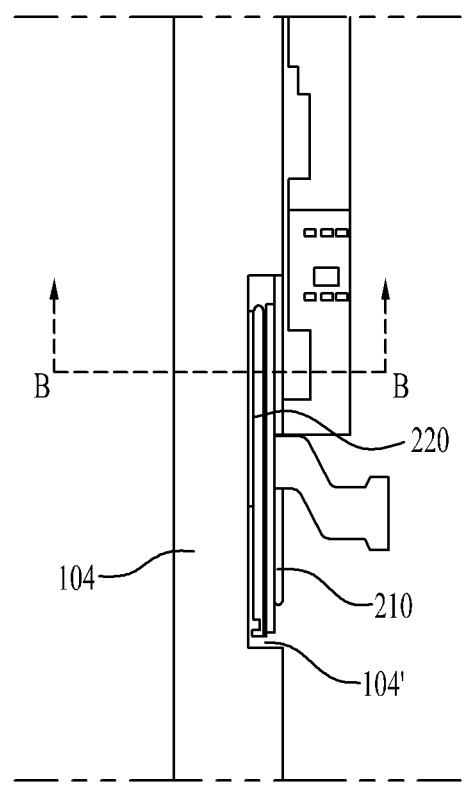
FIG. 10 is a view showing the disposition of an antenna of the present disclosure.
Figure 10:
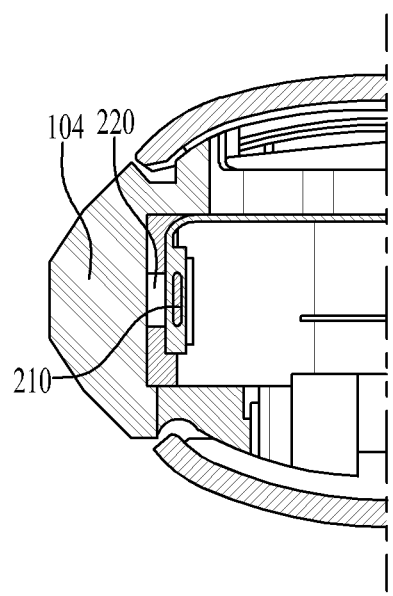

FIG. 10 is a view showing the disposition of the antenna of the present disclosure. FIG. 10($a$) is a view from above, and FIG. 10($b$) is a cross-sectional view taken along line B-B in FIG. 10($a$). In order to improve the radiation performance of the antenna module 220, the antenna module 220 may be disposed further outwards than the user input module 210, and a force sensor may be used as the user input module 210. The force sensor is a sensor that senses a pressing force. Thus, the button part 1231, which is exposed to the outside as shown in FIG. 8, is eliminated, and accordingly, the antenna module 220 may be disposed at an outer portion, as shown in FIG. 10.

Force sensors may be provided in the same number as the number of user input modules 210. Alternatively, a greater number of force sensors may be used in order to sense user input with higher sensitivity. For example, a volume button as the user input module 210 may include a volume up button and a volume down button, and two force sensors may be used, or three or more force sensors may alternatively be used. The pressure sensed by the plurality of force sensors is analyzed, and accordingly, the user input is recognized.

The portion of the side case 104 to which the user input module 210 provided with the force sensor is mounted may be formed to be thin, and may include a material that is easily bent by pressure applied by the user. The side case 104 may have a seating recess 104' formed in the inner surface thereof at a position at which the user input module 210 and the antenna module 220 are mounted. The portion of the side case 104 in which the seating recess 104' is formed may be formed to be thinner, and accordingly, additional space in which to mount the user input module 210 and the antenna module 220 may be secured inside the mobile terminal 100. If the thickness of the side case 104 is too great, the sensitivity of the force sensor, which senses the occurrence of bending deformation by the user, is lowered. Therefore, the user input module 210 is disposed at a thin portion of the side case 104 in order to increase the sensitivity of the force sensor.

Figure 11:
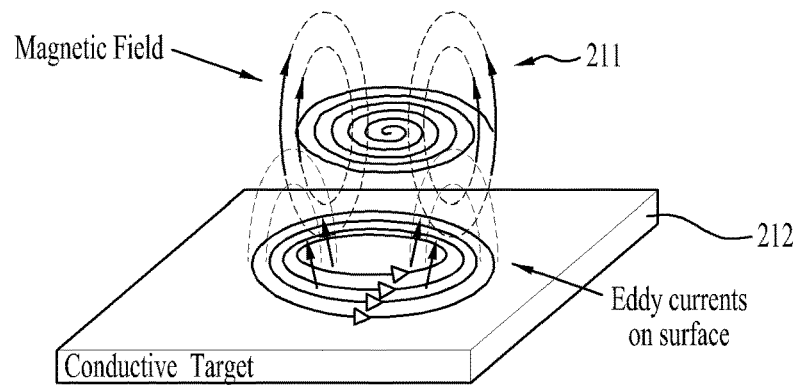
FIG. 11 is a diagram showing an embodiment using an inductive-type force sensor.
Figure 11:
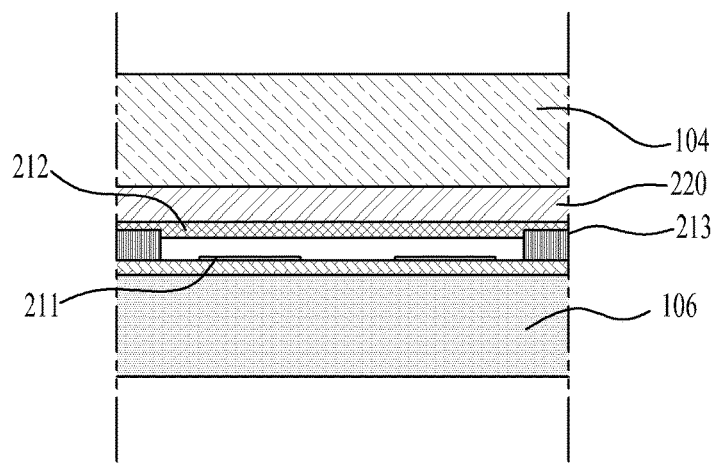
Figure 11:
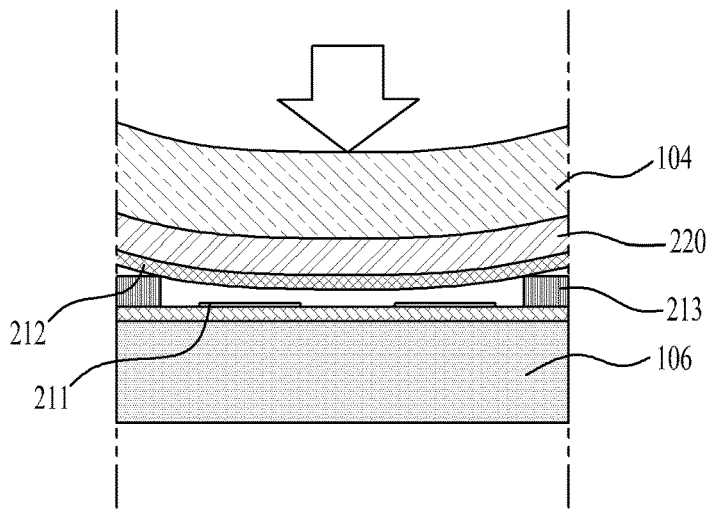

An inductive-type force sensor or a strain gauge may be used as the force sensor. FIG. 11 is a diagram showing an embodiment using an inductive-type force sensor, which includes a sensing coil 211 and a metal layer 212. FIG. 11(a) is a diagram showing an inductive-type force sensor, which is implemented using the principle of induction current. An eddy current is generated with a change in the distance between the metal layer 212 and the sensing coil 211, and accordingly, current flows through the sensing coil 211. Pressure is sensed using a change in the current.

Figure 12:
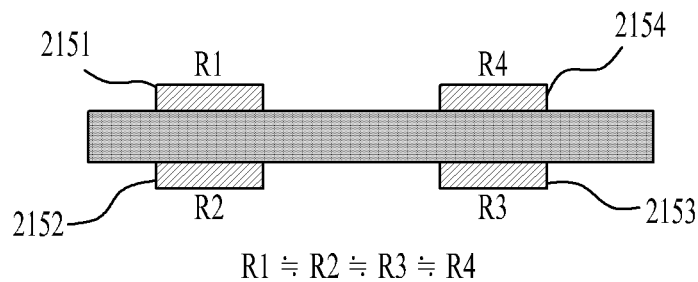
FIG. 12 is a view showing an embodiment using a strain gauge as a force sensor.
Figure 12:
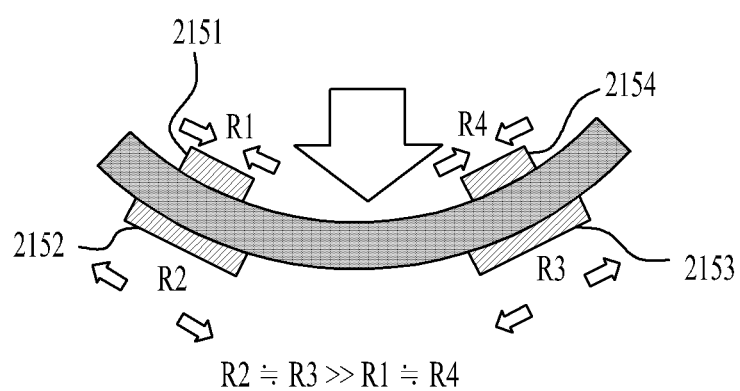
Figure 12:
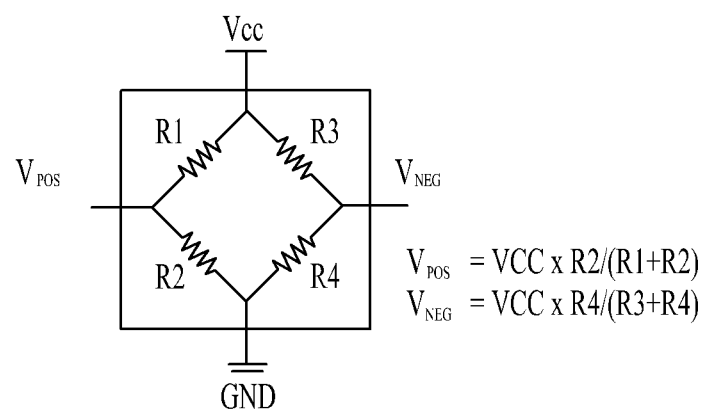

When the user presses the side case 104 in the state shown in FIG. 11(b), the gap between the metal layer 212 and the sensing coil 211 decreases as shown in FIG. 11(c), and accordingly, current flows through the sensing coil 211, whereby user input is recognized. A space needs to be present between the metal layer 212 and the sensing coil 211 in order to accommodate bending deformation of the metal layer 212. Therefore, a spacer 213 may be provided in order to maintain the gap between the metal layer 212 and the sensing coil 211. FIG. 12 is a view showing an embodiment using a strain gauge as the force sensor. Referring to FIG. 12(a), the strain gauge is configured such that a plurality of elements 2151, 2152, 2153, and 2154 is seated on a flexible substrate 183. As shown in FIG. 12(b), when the flexible substrate 183 is bent, the elements 2151, 2152, 2153, and 2154 receive different amounts of force, and thus the resistance values of the elements 2151, 2152, 2153, and 2154 may differ from each other.

The circuit shown in FIG. 12(c) may be implemented using the above properties, and deformation may be sensed based on a Vpos value and a Vneg value. As shown in FIG. 12(a), in the state in which the four elements 2151, 2152, 2153, and 2154 are stably disposed, the magnitudes of the resistances R1 to R4 of the elements 2151, 2152, 2153, and 2154 are equal to each other, and thus Vpos and Vneg are equal to each other. However, as shown in FIG. 12(b), when bending deformation occurs, the resistances R1 and R4 of the first element 2151 and the fourth element 2154 decrease, and the resistances R2 and R3 of the second element 2152 and the third element 2153 increase, and accordingly, Vpos increases and Vneg decreases. If Vpos is less than Vneg, it can be seen that bending deformation has occurred in a direction different from that shown in FIG. 7(b).

As described above, the strain gauge 215 including the four elements 2151, 2152, 2153, and 2154 may be used. However, the user input module 210 of the present disclosure does not need to sense the occurrence of bending deformation in the direction opposite that shown in FIG. 12(b), and thus only two elements may be provided in order to sense bending deformation of the rear case 102. That is, when the user presses the rear case 102, the rear case 102 is deformed, and rear surface touch input is sensed based on the resistance values of the respective elements.

Figure 13:
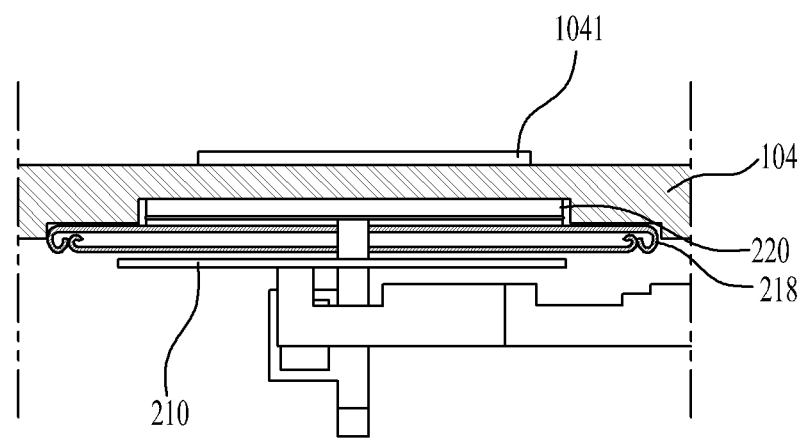
FIGS. 13 and 14 are views showing various embodiments of an actuator of the present disclosure.
Figure 13:
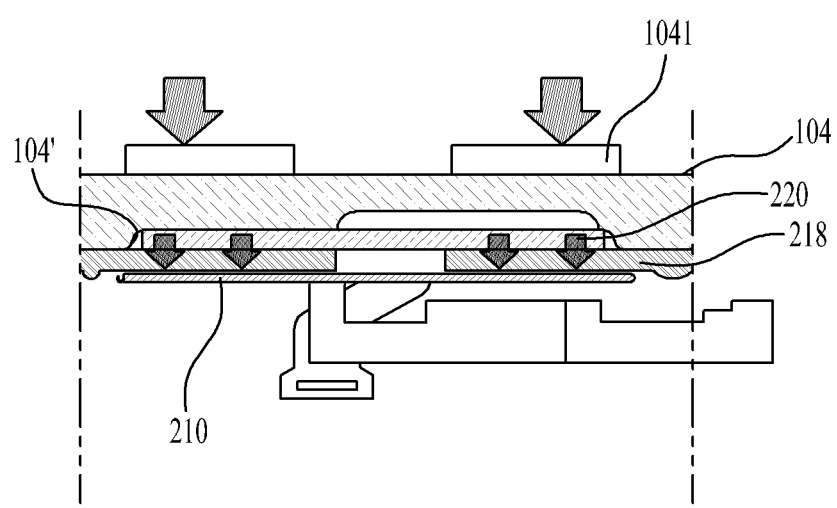
Figure 14:
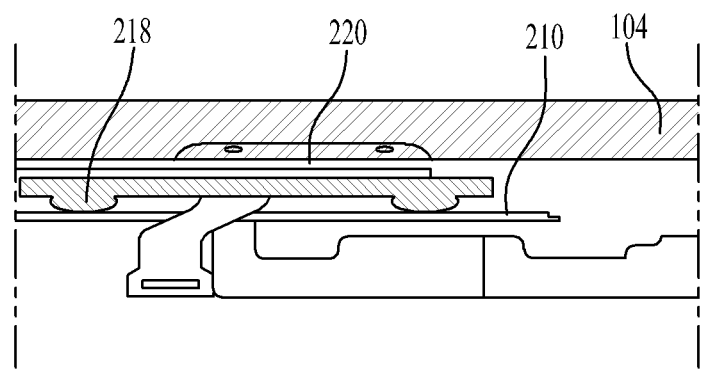
Figure 14:
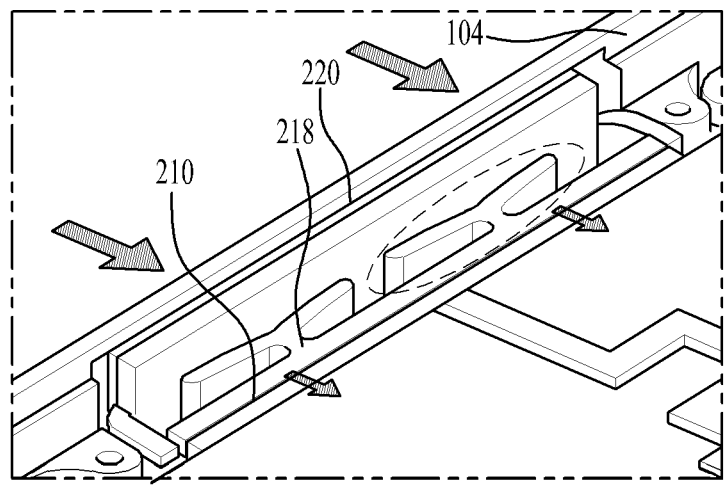

FIGS. 13 and 14 are views showing various embodiments of an actuator 218 of the present disclosure. Referring to FIG. 13(a), the actuator 218 is of a spring type, and is capable of being bent with minute pressure, and the force sensor senses the pressure. As shown in FIG. 13(b), a fixing rib 218 is located behind the antenna module 220 in order to fix the antenna module 220, and is disposed so as to be in contact with the force sensor, whereby the force may be transmitted from the user input module 210 to the force sensor via the fixing rib 218. That is, this embodiment is characterized in that the fixing rib 218 is utilized as the actuator. The fixing rib 218 may be formed integrally with the side case 104, or may be attached to the inner surface of the side case 104 so as to cover a portion of the seating recess 104'.

As shown in FIG. 14(a), an actuator 218, which includes protrusions formed so as to be in contact with a portion at which the force sensor is located, may be used. As shown in FIG. 14(b), the actuator 218 includes separate members that are oriented toward the side case 104. In the case in which two buttons, e.g. volume buttons, are disposed, the actuator 218 may separately receive input applied to each of the two buttons.

FIG. 15 is a view for explaining a method of controlling the antenna module 220 using the user input module in the mobile terminal 100 of the present disclosure. The user input module 210 and the antenna module 220 may be arranged in the leftward-rightward lateral direction of the terminal. The user input module 210 and the antenna module 220 may be located only at one side, or may be located at each of the left and right sides, as shown in FIG. 15. Because a power button is necessary in addition to the volume buttons, and an antenna for mmWave performs beam forming in a specific direction to transmit and receive signals, a plurality of antennas is necessary in order to transmit and receive signals in various directions. Therefore, the user input module 210 and the antenna module 220 may be disposed at each of the left and right sides so as to overlap each other.

In this case, since the force sensor of the user input module 210 is capable of sensing minute pressure, the force sensor may sense pressure when the user's hand touches the user input module 210. When the pressure is lower than a reference pressure, the pressure is not considered to be user input, but it is determined that a touch of the user's hand has occurred. When the user's hand touches the user input module 210, the radiation performance of the antenna module 220 is deteriorated. In this case, the operation of the antenna module 220 overlapping the corresponding user input module 210 is stopped, and radiation may be performed using another antenna module 220.

The antenna module 220 for mmWave wireless communication may be additionally disposed at a position that does not overlap the user input module 210, such as the rear surface of the terminal (Ant 3). When application of pressure to the user input module 210 is sensed, operation of the antenna module Ant.1 or Ant.2, which overlaps the user input module 210, is stopped, and transmission/reception of signals may be performed through an additional antenna module Ant.3.

The above embodiments are therefore to be construed in all aspects as illustrative and not restrictive. The scope of the disclosure should be determined by reasonable interpretation of the appended claims, and all equivalent modifications made without departing from the disclosure should be considered to be included in the following claims.

What is claimed is:

1. A mobile terminal comprising:
   a side case comprising a first recess formed in an inner surface of a first portion of the side case;
   a display unit mounted to a front surface of the side case;
   an antenna module inserted into the first recess at the inner surface of the side case;
   a user input module disposed further inwards than the antenna module so as to overlap the antenna module, the user input module comprising a force sensor configured to sense pressure;

an actuator located between the antenna module and the force sensor, the actuator directly contacting the antenna and the force sensor to transmit force from the antenna to the force sensor; and a controller configured to recognize user input of pushing the first portion based on pressure sensed by the force sensor, wherein the first portion of the side case is thinner than a remaining portion of the side case.

2. The mobile terminal of claim 1, wherein the side case further comprises a button protrusion formed at an outer side thereof at a position corresponding to a position of the force sensor.

3. The mobile terminal of claim 1, wherein the first portion of the side case comprises a nonconductive material.

4. The mobile terminal of claim 1, wherein the actuator comprises a fixing rib covering a portion of the first recess, the fixing rib being located further inwards than the antenna module and overlapping the force sensor.

5. The mobile terminal of claim 1, wherein the antenna module and the user input module are located at at least one of a left side or a right side of the mobile terminal.

6. The mobile terminal of claim 5, wherein the antenna module and the user input module comprises:
   a first antenna module and a first user input module located at the left side of the mobile terminal; and
   a second antenna module and a second user input module located at the right side of the mobile terminal, and
   wherein the controller transmits and receives a signal using the second antenna module when pressure is sensed by the first user input module, and transmits and receives a signal using the first antenna module when pressure is sensed by the second user input module.

7. The mobile terminal of claim 1, wherein, when pressure sensed by the user input module is equal to or higher than a reference pressure, the pressure is considered to be user input.

8. The mobile terminal of claim 1, wherein the antenna module comprises:
   an antenna substrate;
   a plurality of radiation patches located on one surface of the antenna substrate; and
   a wireless communication chip located on an opposite surface of the antenna substrate, the wireless communication chip being configured to transmit a wireless signal through the radiation patches, and
   wherein the one surface of the antenna substrate is in contact with an inner surface of the case.

9. The mobile terminal of claim 1, wherein the user input module comprises:
   a flexible substrate; and
   a strain gauge located on a surface of the flexible substrate, the strain gauge comprising a plurality of elements configured to vary in resistance value when the flexible substrate is bent.

10. The mobile terminal of claim 1, wherein the user input module comprises:
    a metal layer; and
    a sensing coil spaced apart from the metal layer by an air gap, and
    wherein the user input module senses the pressure based on a counter-electromotive force flowing through the sensing coil.

11. The mobile terminal of claim 1,
    wherein the antenna fits within the first recess.

12. The mobile terminal of claim 11, wherein the inner surface of the side case has a second recess, and
    wherein the actuator fits within the second recess.

13. The mobile terminal of claim 1, wherein the case has an inner surface and an outer surface spaced from the inner surface in a first direction,
    wherein a length of the antenna in a second direction is less than a length of the actuator in the second direction.

* * * * *